United States Patent
Epstein et al.

(10) Patent No.: US 10,635,750 B1
(45) Date of Patent: Apr. 28, 2020

(54) CLASSIFICATION OF OFFENSIVE WORDS

(71) Applicant: Google LLC, Mountain View, CA (US)

(72) Inventors: Mark Edward Epstein, Katonah, NY (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/955,066

(22) Filed: Apr. 17, 2018

Related U.S. Application Data

(63) Continuation of application No. 14/264,617, filed on Apr. 29, 2014, now abandoned.

(51) Int. Cl.
   *G06F 17/27* (2006.01)

(52) U.S. Cl.
   CPC ...... *G06F 17/2765* (2013.01); *G06F 17/2785* (2013.01); *G06F 17/274* (2013.01); *G06F 17/2705* (2013.01)

(58) Field of Classification Search
   CPC ............. G06F 17/2705; G06F 17/2765; G06F 17/2785; G06F 17/274
   See application file for complete search history.

(56) References Cited

U.S. PATENT DOCUMENTS

| | | | |
|---|---|---|---|
| 6,556,958 B1 | 4/2003 | Chickering | |
| 6,760,700 B2 | 7/2004 | Lewis et al. | |
| 6,950,812 B2 | 9/2005 | Suermondt et al. | |
| 7,792,846 B1 | 9/2010 | Raffill et al. | |
| 7,962,471 B2 | 6/2011 | Adar et al. | |
| 8,214,363 B2 | 7/2012 | Chaudhary | |
| 8,417,653 B2 | 4/2013 | Probst et al. | |

(Continued)

FOREIGN PATENT DOCUMENTS

EP   1347395   9/2003

OTHER PUBLICATIONS

'alias-i' [online]. "LingPipe: Expectation Maximization (EM) Tutorial," 2003-2011 [retrieved on Apr. 29, 2014]. Retrieved from the internet: URL<http://alias-i.com/lingpipe/demos/tutorial/em/readme.html>, 13 pages.

(Continued)

*Primary Examiner* — Daniel C Washburn
*Assistant Examiner* — Oluwadamilola M Ogunbiyi
(74) *Attorney, Agent, or Firm* — Honigman LLP; Brett A. Krueger

(57) ABSTRACT

A computer-implemented method can include identifying a first set of text samples that include a particular potentially offensive term. Labels can be obtained for the first set of text samples that indicate whether the particular potentially offensive term is used in an offensive manner. A classifier can be trained based at least on the first set of text samples and the labels, the classifier being configured to use one or more signals associated with a text sample to generate a label that indicates whether a potentially offensive term in the text sample is used in an offensive manner in the text sample. The method can further include providing, to the classifier, a first text sample that includes the particular potentially offensive term, and in response, obtaining, from the classifier, a label that indicates whether the particular potentially offensive term is used in an offensive manner in the first text sample.

18 Claims, 5 Drawing Sheets

(56) References Cited

U.S. PATENT DOCUMENTS

| | | | |
|---|---|---|---|
| 8,498,872 B2 | 7/2013 | White et al. | |
| 8,504,356 B2 | 8/2013 | Mizuguchi et al. | |
| 8,515,736 B1* | 8/2013 | Duta | G10L 15/1822 |
| | | | 704/9 |
| 8,521,507 B2 | 8/2013 | Shi et al. | |
| 8,620,836 B2 | 12/2013 | Ghani et al. | |
| 8,862,467 B1 | 10/2014 | Casado et al. | |
| 9,009,041 B2 | 4/2015 | Zavaliagkos et al. | |
| 9,165,329 B2* | 10/2015 | Beechum | G06Q 50/01 |
| 9,280,742 B1* | 3/2016 | Sargin | G06N 5/04 |
| 9,405,741 B1 | 8/2016 | Schaaf et al. | |
| 2003/0033294 A1* | 2/2003 | Walker | G06Q 30/02 |
| 2003/0236664 A1* | 12/2003 | Sharma | G10L 15/08 |
| | | | 704/251 |
| 2004/0107089 A1* | 6/2004 | Gross | G06F 17/274 |
| | | | 704/10 |
| 2005/0010411 A1 | 1/2005 | Rigazio et al. | |
| 2005/0204005 A1 | 9/2005 | Purcell | |
| 2006/0095262 A1* | 5/2006 | Danieli | G10L 15/08 |
| | | | 704/251 |
| 2006/0095524 A1* | 5/2006 | Kay | G06Q 10/107 |
| | | | 709/206 |
| 2006/0253784 A1* | 11/2006 | Bower | H04L 12/1822 |
| | | | 715/738 |
| 2006/0277564 A1 | 12/2006 | Jarman | |
| 2008/0114837 A1* | 5/2008 | Biggs | G06F 17/2765 |
| | | | 709/206 |
| 2008/0134282 A1* | 6/2008 | Fridman | G06Q 10/10 |
| | | | 726/1 |
| 2008/0300971 A1* | 12/2008 | Zeng | G06Q 30/02 |
| | | | 705/14.41 |
| 2009/0041311 A1 | 2/2009 | Hundley | |
| 2009/0198778 A1* | 8/2009 | Priebe | H04L 12/1822 |
| | | | 709/206 |
| 2009/0240692 A1* | 9/2009 | Barton | G06F 16/13 |
| 2011/0091105 A1 | 8/2011 | Spears | |
| 2011/0191097 A1 | 8/2011 | Spears | |
| 2011/0225192 A1* | 9/2011 | Imig | G06F 16/9535 |
| | | | 707/775 |
| 2012/0022865 A1 | 1/2012 | Milstein | |
| 2012/0197936 A1 | 8/2012 | Fuchs | |
| 2013/0007152 A1* | 1/2013 | Alspector | H04L 51/12 |
| | | | 709/206 |
| 2013/0031081 A1 | 1/2013 | Vijayaraghavan et al. | |
| 2013/0041655 A1* | 2/2013 | Spears | G06F 17/30867 |
| | | | 704/9 |
| 2013/0138735 A1 | 5/2013 | Kanter | |
| 2013/0151346 A1* | 6/2013 | Schoen | G06Q 30/02 |
| | | | 705/14.66 |
| 2013/0268517 A1 | 10/2013 | Madhavan | |
| 2014/0074475 A1* | 3/2014 | Kitade | G10L 15/01 |
| | | | 704/251 |
| 2014/0074551 A1* | 3/2014 | Setayesh | G06Q 10/10 |
| | | | 705/7.29 |
| 2014/0172989 A1 | 6/2014 | Rubinstein et al. | |
| 2014/0316784 A1 | 10/2014 | Bradford et al. | |
| 2014/0337989 A1* | 11/2014 | Orsini | H04L 51/12 |
| | | | 726/26 |
| 2014/0365448 A1* | 12/2014 | Keller | G06F 16/3322 |
| | | | 707/692 |
| 2015/0007351 A1* | 1/2015 | Janajri | H04L 63/04 |
| | | | 726/30 |
| 2015/0019204 A1* | 1/2015 | Simard | G06F 17/2785 |
| | | | 704/9 |
| 2015/0088897 A1* | 3/2015 | Sherman | G06F 16/958 |
| | | | 707/740 |
| 2015/0095014 A1* | 4/2015 | Marimuthu | G06F 17/2735 |
| | | | 704/9 |
| 2015/0278196 A1* | 10/2015 | Dua | G06F 17/2785 |
| | | | 704/9 |
| 2018/0121557 A1* | 5/2018 | Dinan | H04L 51/046 |

OTHER PUBLICATIONS

Almeida et al, "Learning to Block UNdesired Comments in the Blogosphere," 12th International Conference on Machine Learning and Applications, 2013, vol. 2, pp. 261-266.

Chen et al, "Detecting Offensive Language in Social Media to Protect Adolescent Online Safety," 2012 ASE/IEEE International Conference on Social Computing and 2012 ASE/IEEE International Conference on Privacy, Security, Risk and Trust, 2012, pp. 71-80.

Lewis et al. "A Sequential Algorithm for Training Text Classifiers," Proceedings of the 17$^{th}$ annual international ACM SIGIR conference on Research and development in information retrieval, 1994, pp. 3-12.

Nigam et al., "Semi-Supervised Text Classification Using EM," Chapelle, Schölkopf & Zien: Semi-Supervised Learning, Nov. 18, 2005, 31-51.

Zhu, "Semi-Supervised Learning Literature Survey," Computer Sciences TR 1530, University of Wisconsin-Madison, Jul. 19, 2008, 1-60.

* cited by examiner

CLASSIFICATION OF OFFENSIVE WORDS

CROSS-REFERENCE TO RELATED APPLICATIONS

This application is a continuation of and claims priority to U.S. application Ser. No. 14/264,617, filed on Apr. 29, 2014, the entire contents of which are hereby incorporated by reference.

TECHNICAL FIELD

This document generally relates to text classification.

BACKGROUND

With the proliferation of computing devices such as smartphones, tablets, and other mobile devices that have become an integral part of people's daily lives, countless opportunities are presented for users to read and interact with different forms of electronic content. With great ease, a single device can be used as a portal to social media content, personal messaging systems, online discussion groups, web sites, games, productivity software, and more. Much of this accessible content, whether authored by someone who is familiar or unknown to a particular user, may include offensive content such as profane words. Software can be used to redact (or obfuscate) potentially offensive words. Some software performs redaction before the offensive content is served to end users, while some software redacts terms from unfiltered content that is received at an end user's device. For example, an offensive term in a text message may be redacted before being delivered to the recipient, or may be redacted from a received message at the recipient's device before the message is presented to a user. Offensive terms may also be redacted from the output of a speech recognizer. Some redaction systems are configured to delete all instances of an offensive term if the offensive term is found in a pre-defined list of offensive terms.

SUMMARY

This document generally describes techniques for training a classifier to determine whether a potentially offensive term in a text sample is likely being used in an offensive or non-offensive manner. The output from such an offensive words classifier can then be used to redact the potentially offensive term from offensive text samples, without removing the term if it is not being used offensively. The classifier can be trained to analyze one or more signals (e.g., features) from the content of the text sample as a whole in order to determine whether the term is being used in a profane, derogatory, or otherwise offensive manner in the text sample. In some implementations, the classifier may also be trained to use extrinsic, non-content based information that indicates additional context about a text sample when determining a degree of offensiveness or category of the text sample. For example, the word "shag" may be offensive in certain contexts, but not in others. Thus, "I hope we can shag tonight" may be offensive, whereas "This great wool shag has a beautiful pattern" likely is not. The offensive words classifier may evaluate the context of the word "shag" from the content of each text sample to determine that the first sample is offensive and that the second sample is non-offensive. Extrinsic context information, such as whether the samples were submitted by a customer at a rug retailer, may also indicate to the classifier relevant information about the offensiveness of a text sample.

This document further describes that the classifier can be trained using semi-supervised machine learning techniques. A first set of training samples that include a potentially offensive term can be manually labeled as being either offensive or non-offensive. The first set of samples can be used to initially train the offensive words classifier. Thereafter, using the expectation-maximization algorithm, for example, the classifier can be repeatedly re-trained in multiple training iterations to improve the accuracy of the classifier. In each iteration, a larger set of training samples can be used to train the classifier by training the classifier on text samples that were labeled by the classifier in a previous iteration. For example, after the first iteration in which a classifier is trained on the manually labeled samples, a second set of text samples can then be labeled by the initially trained classifier rather than by human users. All or some of the labeled second set of text samples can then be used to re-train the classifier in a subsequent training iteration. The iterative process can continue in some implementations until the performance of the classifier converges and no longer improves by a threshold amount after each iteration.

In some implementations, a computer-implemented method can include obtaining a plurality of text samples. A first set of text samples can be identified, from among the plurality of text samples, where each text sample in the first set of text samples includes a particular potentially offensive term. Labels can be obtained for the first set of text samples that indicate whether the particular potentially offensive term is used in an offensive manner in respective ones of the text samples in the first set of text samples. The method can include training, based at least on the first set of text samples and the labels for the first set of text samples, a classifier that is configured to use one or more signals associated with a text sample to generate a label that indicates whether a potentially offensive term in the text sample is used in an offensive manner in the text sample. The method can further include providing, to the classifier, a first text sample that includes the particular potentially offensive term, and in response, obtaining, from the classifier, a label that indicates whether the particular potentially offensive term is used in an offensive manner in the first text sample.

These and other implementations may include one or more of the following features. A second set of text samples can be identified, from among the plurality of text samples, that each includes the particular potentially offensive term. The second set of text samples can be provided to the classifier, and in response, labels can be obtained for the second set of text samples that were generated by the classifier and that indicate whether the particular potentially offensive term is used in an offensive manner in respective ones of the text samples in the second set of text samples. Training the classifier can be further based on the second set of text samples and the labels for the second set of text samples that were generated by the classifier.

The classifier can be iteratively trained by performing multiple training iterations, each training iteration including providing a particular set of text samples to the classifier, obtaining labels for the particular set of text samples that were generated by the classifier in response, and re-training the classifier based at least on the particular set of text samples and the labels for the particular set of text samples that were generated by the classifier.

A particular set of text samples in a first of the training iterations can include more text samples than the particular set of text samples in a training iteration that preceded the first of the training iterations.

The method can further include, for each of at least some of the multiple training iterations, determining a measure of accuracy of the classifier by comparing the labels generated by the classifier for a subset of the particular set of text samples with a control set of labels for the subset of the particular set of text samples that are known to be accurate.

Training the classifier can include using information from the first set of text samples in the expectation-maximization algorithm. Training the classifier can include using the expectation-maximization algorithm.

The method can further include obtaining, in response to providing the first text sample to the classifier, a label confidence score that indicates a confidence that the label correctly indicates whether the particular potentially offensive term is used in an offensive manner in the first text sample.

The one or more signals associated with the text sample used by the classifier to generate the label can include information determined based on content of the text sample.

The information determined based on content of the text sample can include n-gram data for an n-gram in the text sample that includes the particular potentially offensive term.

The information determined based on content of the text sample can include bag-of-words data that indicates a distribution of terms in the text sample.

The one or more signals associated with the text sample and used by the classifier to generate the label can include contextual data associated with the text sample that is not determined based on content of the text sample.

The text sample can be a transcription of an utterance, and the contextual data associated with the text sample can include an indication of user satisfaction with the transcription of the utterance.

The text sample can be a transcription of an utterance, and the contextual data associated with the text sample can include a transcription confidence score that indicates a likelihood that the text sample is an accurate transcription of the utterance.

The one or more signals associated with the text sample used by the classifier to generate the label can include both information determined based on content of the text sample and contextual data associated with the text sample that is not determined based on the content of the text sample.

The plurality of text samples can include text samples obtained from at least one of records of transcribed speech and records of search queries.

The labels for at least some of the first set of text samples that indicate whether the particular potentially offensive term is used in an offensive manner in respective ones of the text samples in the first set of text samples can be manually determined by one or more users.

In some implementations, one or more computer-readable devices can have instructions stored thereon that, when executed by one or more processors, cause performance of operations. The operations can include obtaining a plurality of text samples; identifying, from among the plurality of text samples, a first set of text samples that each includes a particular potentially offensive term; obtaining labels for the first set of text samples that indicate whether the particular potentially offensive term is used in an offensive manner in respective ones of the text samples in the first set of text samples; training, based at least on the first set of text samples and the labels for the first set of text samples, a classifier that is configured to use one or more signals associated with a text sample to generate a label that indicates whether a potentially offensive term in the text sample is used in an offensive manner in the text sample; and providing, to the classifier, a first text sample that includes the particular potentially offensive term, and in response, obtaining, from the classifier, a label that indicates whether the particular potentially offensive term is used in an offensive manner in the first text sample.

These and other implementations can include one or more of the following features. A second set of text samples can be identified, from among the plurality of text samples, that each includes the particular potentially offensive term. The second set of text samples can be provided to the classifier, and in response, labels can be obtained for the second set of text samples that were generated by the classifier and that indicate whether the particular potentially offensive term is used in an offensive manner in respective ones of the text samples in the second set of text samples. Training the classifier can be further based on the second set of text samples and the labels for the second set of text samples that were generated by the classifier.

The operations can further include iteratively training the classifier by performing multiple training iterations, each training iteration comprising providing a particular set of text samples to the classifier, obtaining labels for the particular set of text samples that were generated by the classifier in response, and re-training the classifier based at least on the particular set of text samples and the labels for the particular set of text samples that were generated by the classifier, wherein different particular sets of text samples can be used among particular ones of the multiple training iterations.

In some implementations, a system can include one or more computers configured to provide a repository of potentially offensive terms, a repository of labeled text samples, a repository of non-labeled text samples, a classifier, and a training engine. The repository of labeled text samples can include a first set of labeled text samples for which one or more potentially offensive terms from the repository of potentially offensive terms have been labeled in the first set of text samples so as to indicate likelihoods that the potentially offensive terms are used in offensive manners in particular ones of the text samples in the first set of labeled text samples. The repository of non-labeled text samples can include a first set of non-labeled text samples that include one or more potentially offensive terms from the repository of potentially offensive terms. The classifier can label the one or more potentially offensive terms in the first set of non-labeled text samples to generate a second set of labeled text samples that are labeled so as to indicate a likelihood that the one or more potentially offensive terms in the text samples are used in offensive manners. The training engine can train the classifier based at least on the first set of labeled text samples and the second set of labeled text samples that were labeled by the classifier.

Some implementations of the techniques described herein may achieve one or more of the following advantages. A classifier that labels text samples having one or more potentially offensive terms can be trained with a relatively small number of pre-labeled text samples. In some implementations where the pre-labeled text samples have been manually evaluated and labeled by users, the training techniques described in this paper can be used to train a highly accurate offensive words classifier with a minimal number of manually labeled text samples. A classifier may be trained with a large number of text samples more efficiently by reducing the number of text samples needed in the training set that are manually labeled. In some implementations, output from the trained classifier can be used to selectively redact offensive terms from one or more text samples. As such, potentially offensive terms that are not actually offensive in the context of a particular text sample may avoid redaction. Unlike systems that are configured to redact all instances of a potentially offensive term if the term is found in a profanity list, for example, the classifier may prevent non-offensive terms from being redacted unnecessarily. The classifier can determine a likelihood that a particular term in a text sample is or is not used in an offensive manner in the text sample based on the content of the text sample as a whole rather than considering the term in isolation.

BRIEF DESCRIPTION OF THE DRAWINGS

Like reference numbers and designations in the various drawings indicate like elements.

DETAILED DESCRIPTION

Figure 1:
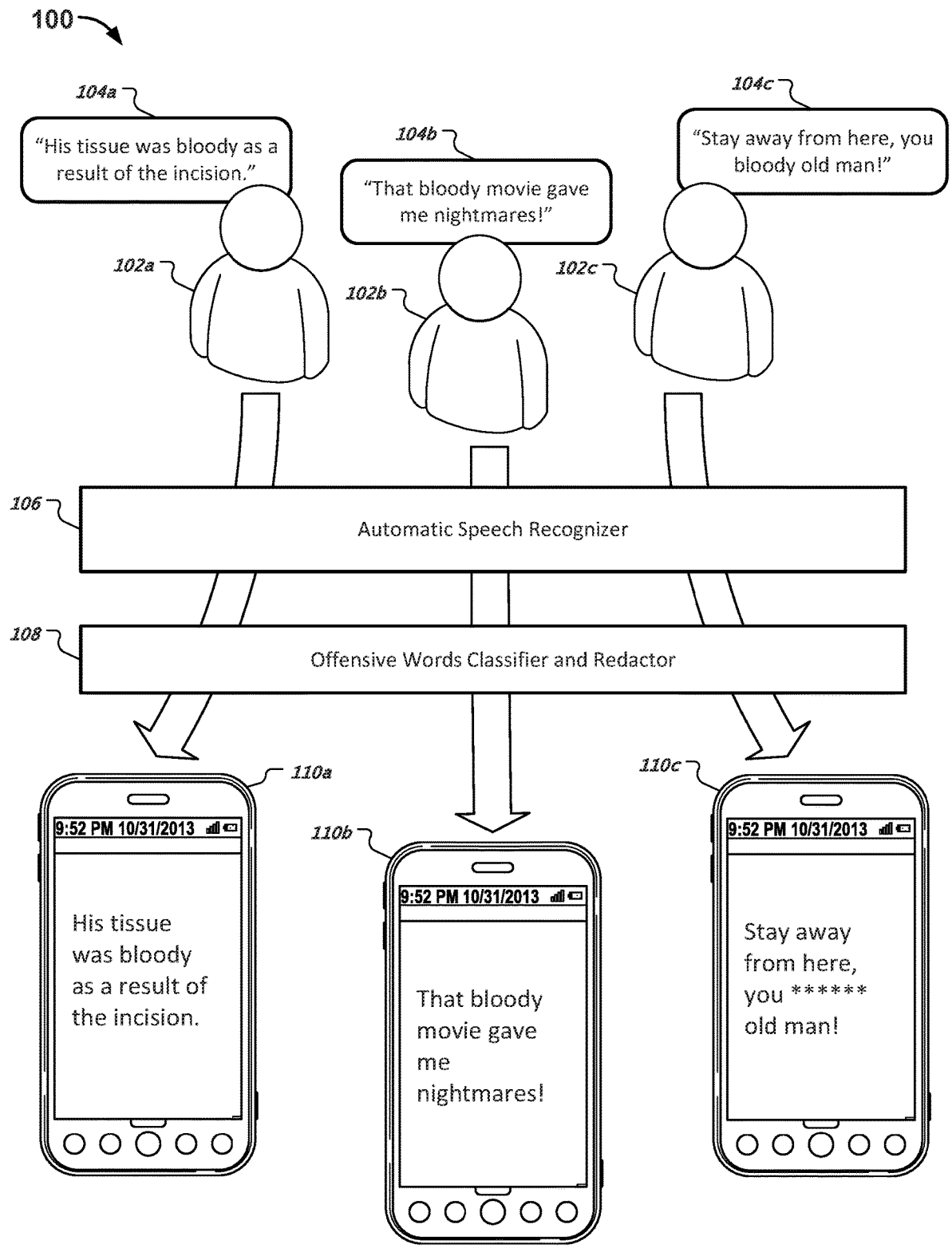
FIG. 1 is a schematic diagram of an example system for selectively redacting an offensive word from a text sample.

This document generally describes techniques for training a classifier to label offensive terms in text. By using a classifier to label offensive terms, such terms can be redacted or otherwise modified before the text is displayed. The classifier can be statistically trained on a large corpus of text samples in order to learn various features that can be associated with a sample of text that may indicate whether a term in the text sample, or the text sample as a whole, is offensive. The labels or other output of the classifier can thus be used to redact words from a text sample that are determined to be offensive. For example, the classifier may be trained to determine whether any one or more profane words, derogatory terms, violent expressions, or sexually explicit words in a sample of text are used in an offensive manner so that action may be taken to automatically filter such terms out of the text. Unlike programs that reference a blacklist of offensive terms to simply redact each instance of a blacklisted term from a text sample, the classifiers described in this paper can evaluate the context of a potentially offensive term in a text sample, as well as extrinsic context information about the text sample, to make an informed decision as to whether a term is actually being used in an offensive manner in the text sample. If the term is in fact benign, then the term can avoid being redacted. In some implementations, the classifier may thus be used to reduce the number of redactions of potentially offensive terms that are in fact benign.

In some implementations, the classifier can be trained on a large quantity of text samples that include a potentially offensive term in order to capture a sufficient breadth and depth of features in the text samples needed to produce a highly accurate classifier. The classifier can be trained and re-trained over multiple training iterations. The initial training iteration can be based on a first set of text samples that have been pre-labeled for supervised training of the classifier. The first set of text samples may be manually evaluated and labeled by one or more human users, whose complex judgment and experiences may be best able to initially determine the respective offensiveness of the text samples. However, manual labeling can be an inefficient process, and there is a practical limit to the number of samples that can be used to initially train the classifier. Accordingly, after the initial training iteration of the classifier, additional unlabeled text samples can be provided to the classifier and labeled (and/or scored) by the classifier to indicate whether respective potentially offensive terms in the text samples are used in an offensive manner in the text samples. The additional text samples labeled by the classifier can then be used as training samples in a subsequent training iteration. The classifier can be repeatedly re-trained in this manner until the accuracy of the classifier reaches a desired level or until the performance of the classifier converges.

An example use of an offensive words classifier is shown in FIG. 1, which depicts a schematic diagram of a system for selectively redacting an offensive word from a text sample. In particular, FIG. 1 depicts selective redaction of a potentially offensive term from the output of a speech recognizer 106. Generally, three users 102*a-c* are shown uttering three respective speech samples 104*a-c*. Each of the speech samples 104*a-c* includes a potentially offensive term, "bloody." In some contexts, the term "bloody" can be a profane word that may cause people to take offense, while in other contexts, "bloody" may be non-offensive. As such, "bloody" should only be redacted when it is actually offensive, but should be undisturbed in a text sample when it is non-offensive. This system 100 can use offensive words classifier and redactor 108 to this end. In some implementations, the offensive words classifier and the redactor can be separate modules.

As shown in FIG. 1, user 102*a* utters a non-offensive speech sample 104*a*, "His tissue was bloody as a result of the incision." The user 102*a* may be speaking into a personal device such as a smartphone or other computer to transcribe notes or to quickly communicate a message without typing. The speech sample 104*a* is processed by an automatic speech recognizer, which generates a textual transcription of the speech sample 104*a*. For example, the output of the speech recognizer 106 may be the text "His tissue was bloody as a result of the incision." The output of the speech recognizer 106 can be processed by offensive words classifier and redactor 108. The offensive words classifier can evaluate both content-based signals (features) and non-content based signals of the transcription from the speech recognizer 106 to determine whether the text sample most likely uses "bloody" in an offensive or non-offensive manner. In this example, the classifier determines that "bloody" as used in the transcription of utterance 104*a*, is non-offensive. Accordingly, the transcription itself or the term "bloody" in the transcription may be labeled non-offensive by the offensive words classifier 108 and not redacted from the transcription that is ultimately displayed on computing device 110*a*. The classifier, for example, may recognize that when "bloody" is used with words like "tissue" and "incision," it is most likely being used in a medical or physiological sense rather than an offensive, profane manner.

By contrast to the non-offensive use of "bloody" in speech sample 104*a*, user 102*c* utters an offensive instance of "bloody" in speech sample 104*a*: "Stay away from here, you bloody old man!" The speech sample 104*a* is transcribed to text by speech recognizer 106, and then the offensive words classifier 108 can recognize from the context of the transcription that "bloody" is used offensively in this example. Accordingly, "bloody" is redacted in the display of the transcription on computing device 110c.

Speech sample 104b, "That bloody movie gave me nightmares!", is less clearly offensive or non-offensive than samples 104a and 104c. In speech sample 104b, for example, the term "bloody" may be a literal description of a gruesome movie portraying bloody scenes, or may be a profane exclamation about the movie. In some implementations, the offensive words classifier and redactor 108 may be configured to redact the term in this borderline case to protect users' eyes from content that is not clearly non-offensive. However, as shown in FIG. 1, the classifier 108 determines that "bloody" in this instance is most likely non-offensive, and the term is not redacted. This may be determined based on extrinsic context information associated with the speech sample 104b (or its transcription). For example, because the speech sample 104b was uttered on Halloween, Oct. 31, 2013, the classifier may identify a strong likelihood that user 102b was referring to a gruesome horror movie. Other extrinsic context signals that may affect the output of the classifier are described further below.

Figure 2:
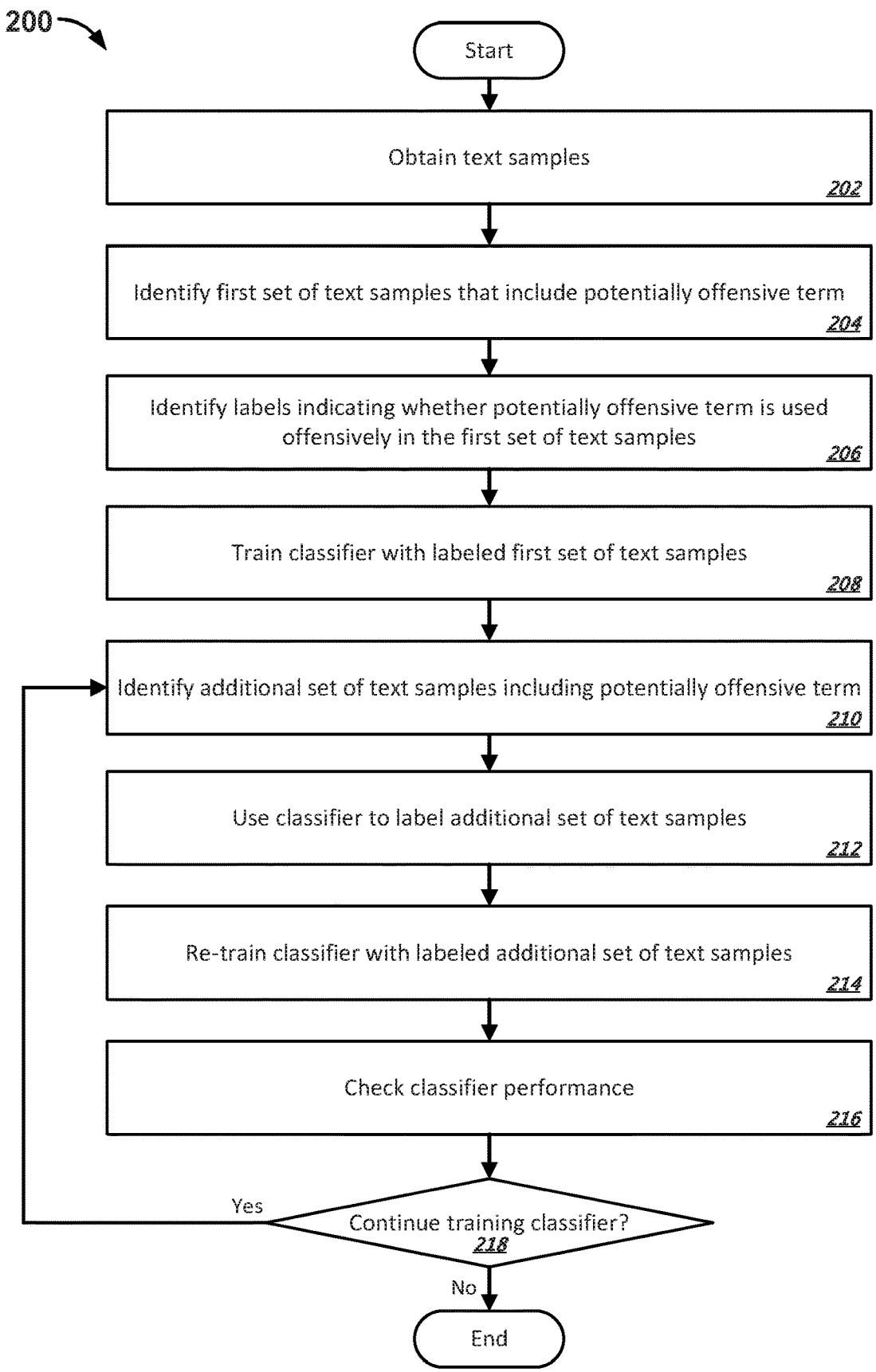
FIG. 2 is a flowchart of an example process for iteratively training an offensive words classifier using labeled and unlabeled text samples.

With reference to FIG. 2, an example process 200 is shown for training an offensive words classifier. In some implementations, the process 200 may be carried out by the system 400 described with respect to FIG. 4, and by other techniques described throughout this paper.

The process 200 begins at stage 202, in which a plurality of text samples is obtained. Generally, the text samples can each include one or more terms. The text samples may be obtained from one or more corpora of data. For example, text samples may be identified and collected from logs of search queries, transcription logs of speech samples that have been converted to text by a speech recognizer, messaging logs (e.g., e-mail, SMS, chat sessions), and information obtained from publicly available documents such as web pages, books, news articles, and the like. In some implementations, the process 200 may use text samples from just one or more particular corpora, or may select a determined distribution of text samples from among multiple corpora. For example, the process 200 may seek to maximize the relative number of text samples from speech transcription logs over text samples from other corpora since speech transcription logs may include the closest examples of vocabulary and grammar in a language to that which is expected to be received by the offensive words classifier trained by this process 200. In some implementations, the process 200 may determine an age associated with all or some of the text samples, and may select text samples that are determined to be associated with a particular period of time or that are less than a maximum age. Thus, for example, only text samples that were generated within a recent time period may be selected so as to train the classifier with text samples that reflect a current usage of the language.

At stage 204, a first set of text samples are identified that include a potentially offensive term. In some implementations, a filtering algorithm can be performed on the text samples obtained at stage 202 to select all or a portion of the text samples that are determined to include a particular potentially offensive term. The first set of text samples may include only text samples that include a particular potentially offensive term, or may include text samples that include at least one of multiple different potentially offensive terms. Thus, the process 200 may train a classifier for a particular potentially offensive term using only text samples that include the particular potentially offensive term at one time, or may train the classifier on multiple different potentially offensive terms at a time. In some implementations, potentially offensive terms can be identified from a pre-determined list of offensive terms (e.g., in a repository of offensive terms). The list of offensive terms may be language-specific and may be geographic-specific. For example, some terms may be offensive in English but not Chinese, or vice versa. Some terms may be offensive as used in English in the United States, but non-offensive as used in English in Great Britain, as another example (e.g., bloody, shag).

In some implementations, the first set of text samples can include text samples that are determined to include a substantially equivalent representation of the potentially offensive term. A slang or shorthand version of a potentially offensive term may be detected as if it was the full potentially offensive term itself, or may be replaced with the full potentially offensive term in the text sample. For example, text samples that originated from text messages or other sources in which shorthand communications are common may use abbreviated spellings of words and concise grammars that less frequently occur in more formal contexts such as published documents. The process 200 may determine that a particular term in a text sample is an equivalent shorthand or misspelling of a potentially offensive term in the list of offensive terms so that the text sample may be included in the first set of text samples even though the term is not identical to a term in the list of offensive terms.

At stage 206, the process 200 identifies labels that indicate whether the potentially offensive term(s) in each of the text samples in the first set of text samples is used in an offensive manner. The labels may be applied to the particular potentially offensive term(s) within the text samples, or the labels may be associated with the text sample itself without specific reference to the particular potentially offensive term(s) within the text samples. For example, the text sample "That's a bloody mess" may be labeled as "That's a <offensive>bloody</offensive> mess," or the offensiveness label may be an attribute of the text sample as a whole.

In some implementations, the first set of text samples and their respective labels can be used as a starting set to initially train the classifier. The first set of text samples may be used by a training engine to determine initial probabilities for particular signals that indicate whether a potentially offensive term in a given text sample is or is not offensive in that text sample. The accuracy of the labels for the first set of text samples may be verified or otherwise trusted. In some implementations, all or some of the labels for the first set of text samples can be manually provided by one or more human users. For example, one or more people retained by an organization may manually evaluate text samples one-by-one and determine whether each instance of the potentially offensive term(s) in the text samples is actually used offensively or is non-offensive. In some implementations, a plurality of people may submit the labels for the first set of text samples, such as through a crowdsourcing process. The crowdsourcing may be direct, for example, by formally enlisting a disparate group of people to evaluate the offensiveness of terms in text samples.

In some implementations, labels or other indications of offensiveness of text samples in the first training set may be determined based on voluntary user interactions with particular text samples. User reviews, comments, or other feedback may be used to determine labels of text samples. For example, some text samples may be harvested from user-submitted text on a discussion board, from product reviews, or online article comments. Such text samples may be subject to review by other users who may report inappropriate content. Such reports may be used as an indication that the potentially offensive term in a text sample is used in an offensive manner. In some examples, reports of offensive content can be manually reviewed to determine the trustworthiness of the report before labeling the text sample as offensive, or reports may be trusted if a threshold number of reports are received that indicate a text sample is offensive.

In some implementations, labels may be associated with an offensiveness score that indicates a degree of offensiveness of a term in a particular text sample. For example, although in some implementations a label may simply indicate a category (e.g. offensive or non-offensive) of a potentially offensive term in a text sample, in other implementations, a label may be represented by a score that more finely indicates how offensive or non-offensive a term is being used in a text sample. For example, a particular potentially offensive term that is used near a racial term or other highly offensive term in a text sample may be assigned a highly offensive score, whereas a more commonly used phrase that may not be offensive to some but that may be offensive to others may be assigned a more neutral score near the boundary between offensive and non-offensive. Such offensiveness scores may be determined manually by one or more human users for the first set of text samples.

At stage 208, an offensive words classifier is trained using the labeled first set of text samples. Stage 208 can be the first of multiple training iterations in training the classifier. In this first iteration, initial rules and signals may be determined so as to configure the classifier to be able to recognize one or more signals (or features) associated with a text sample and to generate an offensiveness label for the text sample. The first training iteration using the labeled first set of text samples can train the classifier with a relatively limited knowledge base that may not be capable of accurately labeling the offensiveness of a wide variety of text samples. However, the classifier can be refined and its accuracy improved through additional training cycles that re-train the classifier using increasingly larger and diverse sets of text samples. The initial training iteration may be limited by the size of the first set of text samples in some implementations. For example, the first set of text samples may be manually labeled by human users. Manual labeling of the first set of text samples may allow users to train the classifier initially based on labels that were determined based on sophisticated reasoning rooted in human judgment and experience. In some implementations, supervised machine learning techniques using the manually labeled first set of text samples may be used to initially train the offensive words classifier. However, manually labeling text samples can be an inefficient process. Scarcity of human resources available to label training samples may impose a practical cap on the number of text samples that are manually labeled, which may be far less than the overall number of text samples that are available to train the classifier or that would be desired to train the classifier with sufficient depth and breadth. Accordingly, the first set of text samples may include only a small portion of all obtained samples that include a particular potentially offensive term, because users may only be able to label a limited portion of the text samples in a given time. The manual labeling process can be somewhat inefficient, but still an effective means for initially training the offensive words classifier. In subsequent iterations, as described below, the classifier may be refined by training with additional text samples that may not be manually labeled.

Training the classifier can include determining one or more signals associated with a text sample that tend to indicate whether a potentially offensive term in the text sample is more or less likely being used in an offensive manner in the text sample. Accordingly, when the trained classifier later receives a text sample at runtime, the presence of particular ones of the signals may be used by the classifier to determine whether or not a potentially offensive term in the text sample is being used in an offensive manner or to otherwise determine a degree of offensiveness (e.g., an offensiveness score) of the term. In some implementations, each training iteration of the classifier in the process 200 can employ supervised learning using increasingly larger training sets. In some implementations, the process 200 can determine from a training set of text samples that particular signals are more indicative of the offensiveness of a term than other signals. The more indicative signals may be weighted in the classifier higher than the less indicative signals so that the presence or absence of a more indicative signal influences the offensiveness score of a term in a text sample more than a less indicative signal.

For example, the first set of text samples may include the following three text samples: (i) "Get away from me, you bloody old man," (ii) "That bloodied man had better get some help fast," and (iii) "That bloodied man was quickly heading toward unconsciousness." The potentially offensive term "bloody" and its related term "bloodied" are pre-labeled as being offensive in the first two samples, but non-offensive in the third sample. The process 200 may determine that a trigram of three consecutive words with the adjective "old" between terms "bloody" and "man" is a stronger signal of offensiveness than the trigram "That bloodied man," which is used in both an offensive and non-offensive context in different training samples. Therefore, the presence of the phrase "bloody old man" may be a higher weighted signal in the trained classifier than the phrase "that bloodied man." In some implementations, where the training samples are not only labeled but also have a quantitative offensiveness score, the process 200 can adjust how much impact particular features of a text sample will have when training the classifier. For example, the first text sample noted above, "Get away from me, you bloody old man," may have a high offensiveness score, e.g. 9/10, whereas the second text sample, "That bloodied man had better get some help fast," may have a relatively lower offensiveness score of e.g., 6/10. Therefore, signals such as trigrams identified from the first text sample may be determined, based on the respective offensiveness scores, to be more indicative of offensiveness than signals identified from the second text sample.

The process 200 can identify different types of signals associated with the first set of text samples to train the classifier. The signals may include content-based signals and non-content context signals. Content-based signals may be determined intrinsically from the content of the text samples themselves. Non-content context signals may be determined from extrinsic information associated with the text samples that are not directly determined from the text of the text samples. Some examples of content-based signals include n-grams and bag-of-words representations of text samples. Some examples of non-content context signals include offensiveness scores, transcription confidence scores, information that characterizes user interaction with a text sample, an identity or categorization of an application associated with the text sample, and information about a user associated with the text sample.

Text within the text samples can be used to train the classifier on one or more content-based signals. In some implementations, the content of a text sample may provide the strongest indicator of whether a potentially offensive term is being used in an offensive manner in the text samples. Thus, the influence of content-based signals may be weighted relatively high in the trained classifier. By training the classifier to recognize content-based signals of a text sample, the classifier may be configured to make better judgments about the offensiveness of a term in a text sample than simply detecting that a term in isolation is included in a blacklist of offensive terms, for example.

In some implementations, the process 200 may train a classifier based on n-gram signals determined from the first set of text samples. Trigrams of three consecutive terms that include the potentially offensive term may be used as a signal that indicates whether the potentially offensive term in a text sample is used offensively. In some implementations, n-grams of other sizes may be used. The process 200 can determine, based on the labeled first set of text samples, a probability that an instance of a potentially offensive term in a text sample is or is not offensive given the presence of a particular trigram in the text sample. For example, if one or more text samples which include the sequence of terms "that bloody old" have been labeled offensive, the process 200 may record the trigram "that bloody old" as a signal that increases the probability that a text sample is offensive. The weight of the signal may be influenced based on the number of text samples encountered that include "that bloody old" for which the text sample is labeled as being offensive. For example, if the first set of text samples includes multiple text samples with the phrase "that bloody old," and each of the multiple samples is offensive, then the strength of the signal may be relatively strong. On the other hand, counter-instances of text samples including the same phrase "that bloody old" which are labeled non-offensive may decrease the strength of the signal. Similar logic may apply to other signals—e.g., for any given signal, the greater number of training samples that include a particular signal and that are labeled in the same way may increase the strength of the signals. Signals may be weaker where there are fewer samples available that include the signal, or where different text samples that include the signal inconsistently map to different labels.

The classifier can also be trained based on bag-of-words models of the text samples in a training set of text samples. A bag-of-words model of a text sample can be a vectorized representation of the text sample that disregards the grammar and order of words in the text sample. For example, each term in a large set of terms in a language may be indexed and assigned an index value that corresponds to a vector location for the term. The bag-of-words model for a text sample can be generated by increasing, for each term in the text sample, the vector value at the vector location (index value) that corresponds to the term. Thus, the bag-of-words model of a text sample can indicate the distribution of terms in the text sample. The process 200 can statistically analyze the bag-of-words models of all or some of the first set of text samples to determine signals from the bag-of-words models that indicate whether a potentially offensive term is likely used in an offensive manner in a particular text sample. One or more classifier signals may be determined based on an aggregate analysis of the bag-of-words models of text samples. For example, the process 200 may recognize, using the bag-of-words models, that many text samples which included particular terms or combinations of terms were labeled as being offensive. In response, a classifier signal can be trained to identify the presence of the particular terms or combinations of terms as an indicator that a text sample including the potentially offensive term is offensive.

Non-content context information can also be used to train one or more signals of the classifier. Non-content context information is generally information associated with a text sample that is extrinsic to the content (text) of the sample itself, but that may nonetheless still provide a clue as to whether a potentially offensive term is or is not in fact used offensively. Such non-content context information may be any information that tends to show whether a text sample as a whole or a potentially offensive term in the text sample is or is not offensive. Non-content context information may be obtained from a number of sources. For example, logs that were mined to obtain the training text samples may include associated data for all or some of the text samples, which can be provided to a training engine for use in training the classifier. As with intrinsic textual content of the text samples, the process 200 may perform an aggregated analysis of the non-content context information of the first set of training text samples to generate one or more classifier signals that indicate whether a particular potentially offensive term is used in an offensive manner. A particular piece of non-content context information that is found among multiple offensively labeled text samples, for example, may be used as a classifier signal indicative of offensiveness. Likewise, a particular piece of non-content context information that is found among multiple non-offensively labeled text samples may be used as a classifier signal indicative of non-offensiveness.

One example of non-content context information from which a classifier signal may be determined is information that characterizes user interaction with a text sample. In some implementations, the text samples used to train the classifier may be obtained from logs of speech recognition data. The text samples may be transcriptions of utterances received from many different users at respective client devices. The logs may include information about whether the users were satisfied with the transcription, which may be used to train a classifier signal. For example, if a user speaks "Tell the lady at the store that I'd like to pick up my shag tonight," and an automatic speech recognizer generates an accurate transcription for the utterance, the word "shag" may be redacted if it was determined to be offensive. If the user then manually edits the transcription to insert the word "shag," such information may be recorded as an indication that the user was not satisfied with the transcription provided in response to the utterance. Re-insertion of a redacted word may indicate that a word is non-offensive. Accordingly, re-insertion of a redacted word may be used as a signal in the classifier that weighs toward labeling a text sample as being non-offensive.

In some implementations, classifier signals may be trained based on whether a user took some action to confirm the accuracy of a transcribed text sample. For example, an inaccurate transcription that mistakenly interpreted a user's utterance as including a profane word may have the profane word redacted when presented to a user. If the user then manually corrects the redacted word to a different word than what the speech recognizer believed the word to be, then the text sample for the transcription may be determined to likely be non-offensive. Thus, user correction of a redacted word in a transcribed text sample may be a signal that the text sample was inaccurately transcribed, and therefore likely non-offensive. Moreover, possibly inaccurate transcribed text samples may be discarded or discounted when training the classifier so as to prevent inaccurate data from influencing how the classifier signals are trained. In some implementations, the training text samples may include a transcription confidence score determined by the speech recognizer that generated the text samples. The transcription confidence score can indicate a confidence in the accuracy of the transcription. If the transcription confidence score for a text sample does not satisfy a pre-determined threshold score, then the text sample may be excluded from the training set.

In some implementations, user feedback related to a text sample can be used to train a non-content context signal of the classifier. For example, for text samples that were scraped from social media posts, online forum discussions, or user comments on websites, the text sample may be subjected to critique from a community of users. Inappropriate social media posts may be reported, and commentary from websites may be reviewed by users to identify inappropriate and offensive content. Such reports of offensive content directed to particular text samples in the training set can be used in training the classifier. For example, the classifier may be trained to increase the offensiveness score of a text sample during runtime if the text sample is associated with a report that the text sample is inappropriate or offensive.

The classifier may also be trained to consider information about a user who generated the text sample and/or an explicit or implied categorization of the text sample. For instance, a portion of the first set of text samples used to train the classifier may be associated with respective accounts of users who authored the text samples. The process 200 may obtain information about those users that indicates, for example, whether the users have a history of posting offensive content or have associations with other groups or users who post offensive content. The training engine can determine certain characteristics about authors of the text samples that tend to indicate whether a given text sample is likely to use a potentially offensive term in an offensive or non-offensive manner. In some implementations, the process 200 can train the classifier by analyzing categories of the text samples. For example, the process 200 may determine that text samples that relate to certain subject matter or particular topics are more or less likely to be labeled as being offensive. The subject matter or topics may be provided to a training engine as metadata associated with the text sample, or may be determined by the training engine based on content of the text sample. In some implementations, the subject matter or topic may be determined based on a source of the text sample. For example, one or more classifier signals may be trained based on the identity or subject matter of a website or application from which a text sample was obtained. Thus, the process 200 may determine that text samples obtained from adult humor websites are more likely to be offensive, and a classifier signal can be created to reflect this determined correlation. Generally, the process 200 can train the classifier by analyzing patterns in various non-context context information associated with text samples in the training set to determine which pieces of information tend to be associated with text samples that are labeled as being offensive and which pieces of information tend to be associated with text samples that are labeled as being non-offensive.

After the classifier is initially trained at stage 208 to use one or more content-based signals and/or non-content context-based signals associated with a text sample, the classifier can then be re-trained in one or more subsequent training iterations. The classifier may continue to be re-trained through multiple iterations to hone the accuracy or other performance metrics of the classifier. However, while the classifier may have been initially trained on a relatively small number of text samples in the first set that were hand-labeled by one or more users, subsequent re-training stages may use increasingly larger and diverse sets of text samples that have been labeled by a classifier that was trained in a prior iteration. For example, if users manually labeled 1,000 text samples that comprised the first set of text samples, and used these text samples to initially train the classifier, in subsequent iterations, progressively larger corpora of training samples—e.g., 5,000, 50,000, 1,000,000 samples—can be used to re-train the classifier that were labeled by a classifier from a preceding iteration. The process 200 can implement the expectation-maximization algorithm in some examples. In some implementations, the classifier is trained using semi-supervised learning techniques in which the initial training iteration is supervised, and subsequent iterations use labeled data to train the classifier that were labeled by the classifier itself as trained in a previous iteration.

Subsequent re-training iterations are depicted in the flowchart at stages 210-218. At stage 210, the process 200 identifies an additional set of text samples that include a potentially offensive term. The additional set of text samples can include the same particular potentially offensive term as the first set of text samples. In some implementations, the additional set of text samples can include all or some of the text samples from the first set (or any previous set used in a prior training iteration), along with additional text samples that were not in the first set. In some implementations, the additional set of text samples can consist only of new text samples that were not included in any set of text samples used to train the classifier in a previous iteration. The additional set of text samples can be selected from the text samples obtained at stage 202. Although the additional set of text samples may include some text samples that have been pre-labeled, generally the additional set is substantially comprised of unlabeled text samples that have not yet been classified as being either offensive or non-offensive.

At stage 212, the additional set of text samples is provided to the classifier and the classifier labels all or some of the additional set of text samples. In the training iteration immediately subsequent to the initial training iteration, the additional set of text samples can be labeled by the version of the classifier that was initially trained at stage 208. In subsequent training iterations, the additional set of text samples for a particular iteration can generally be labeled by the version of the classifier that was trained in an immediately preceding iteration. The accuracy of the classifier can improve with each training iteration, and therefore the additional set of text samples may be labeled by the most accurate version of the classifier available, which is generally the classifier trained in the previous iteration. If the classifier accuracy did not improve in a previous iteration, then the additional set of text samples can be provided to a different version of the classifier that is more accurate than the classifier trained in the immediately preceding iteration. If the additional set of text samples includes text samples that have previously been labeled, such as the first set of text samples, the classifier may generate new labels for these text samples, or the process 200 may withhold a portion of the additional set of text samples that have been previously labeled from being re-labeled by the classifier. In the latter case, the additional set of text samples may include a first portion that is labeled by the classifier from the previous iteration, and a second portion that has been labeled manually, for example, but that was not labeled by the classifier.

The text samples from the additional set that are provided to the classifier can be labeled based on one or more features of the text samples. The features of the text samples can correspond to the signals on which the classifier has been trained. The classifier can identify both content-based signals and non-content context-based signals associated with particular text samples to generate respective labels for the text samples. For example, the bag-of-words representation of a particular text sample may closely match the bag-of-words representations of text samples from a training set that were labeled so as to indicate that the potentially offensive term in the text samples were deemed to be offensive. Accordingly, the classifier may determine that the particular text sample is offensive and generate a corresponding label. Likewise, if the classifier identifies that the particular text sample originated from a particular application from which a high frequency of offensive text samples in the training set also originated, this too may influence the classifier to label the particular text sample as being offensive, consistent with the samples in the training set that shared the same feature as the particular text sample from the additional set of text samples. In some implementations, the classifier may generate respective offensiveness scores for the text samples that represents a confidence or likelihood that a term in a text sample is or is not used in an offensive manner. The score can be generated in addition to or rather than the label.

At stage 214, the process 200 re-trains the classifier with the labeled additional set of text samples. The classifier can be re-trained in each iteration with text samples that were labeled by a classifier that was trained in a prior iteration. Through this process, classifier signals can be refined and re-weighted, and additional signals may be trained on a larger set of samples than what was used in a prior iteration. In some implementations, the classifier can be re-trained by taking the confidence or offensiveness scores of the additional set of text samples into consideration. The impact of a text sample that the classifier has very confidently determined to be offensive may be greater than a text sample with a comparatively lower confidence score. For example, consider two text samples from the additional set that each include the trigram "that bloody man." One of the text samples has been labeled offensive with a confidence score of 9/10, while the other of the text samples has been labeled non-offensive with a confidence score of 2/10. In a re-training stage of the process 200, the re-trained classifier may be configured to recognize the "that bloody man" trigram primarily as a signal that tends to indicate that a text sample may be offensive, rather than non-offensive. The effect of the non-offensive text sample may be discounted when training the classifier because of its lower confidence score. In some implementations, text samples in the additional set of text samples whose confidence score does not satisfy a threshold score can be eliminated from the training set altogether. For example, the process 200 may discard any text samples that have a confidence score less than, say, 4/10, so that future generations of classifiers are not trained on text samples that may have been incorrectly labeled.

At stage 216, the performance of the re-trained classifier can be measured. In some implementations, the performance of the respective re-trained classifier can be checked after each training cycle. With the expectation-maximization algorithm, the accuracy of the classifier may improve after each training cycle for a number of training cycles. However, the marginal improvement may decrease cycle over cycle until the accuracy or other performance metric of the classifier converges and fails to improve at least a threshold amount after each training cycle. For example, the classifier may be 60% accurate after an initial training cycle (iteration), 80% accurate after a second training cycle, 90% accurate after a third cycle, and 92% accurate after a fourth cycle. Additional training cycles may not improve the accuracy of the classifier an appreciable amount.

At stage 218, the process 200 determines whether to continue training the classifier. If so, an additional training iteration can be performed by returning to stage 210, and identifying another set of text samples that include a potentially offensive term, using the classifier to label the set, and re-training the classifier with the additional set of text samples. In some implementations, the determination of whether to continue training the classifier with an additional iteration can be based on a determined performance metric of the particular classifier that is generated after each iteration. For example, the classifier may be trained until its accuracy reaches a specified level. In some implementations, the classifier may continue to train until its accuracy converges and the marginal improvement in accuracy from one training iteration to the next falls below a threshold. In some implementations, the classifier may be trained a pre-predetermined number of cycles without regard to a performance metric. For example, the process 200 may be pre-configured to execute a total of 5 or 10 training iterations, or any other randomly determined or user specified number of iterations.

A measure of the accuracy of the classifier can be determined in a number of ways. In some implementations, a statistical cross-validation technique can be performed. In some implementations, the accuracy of the classifier can be tested against a verification set of text samples. The text samples in the verification set each may include the potentially offensive term that the classifier has been trained on and may be associated with a pre-defined label that indicates whether the term is being used in an offensive manner in the text sample. Each generation of the re-trained classifier can be requested to label the text samples in the verification set, and the accuracy of the classifier can be scored based on how many text samples were correctly labeled so as to match the pre-defined label.

Figure 3:
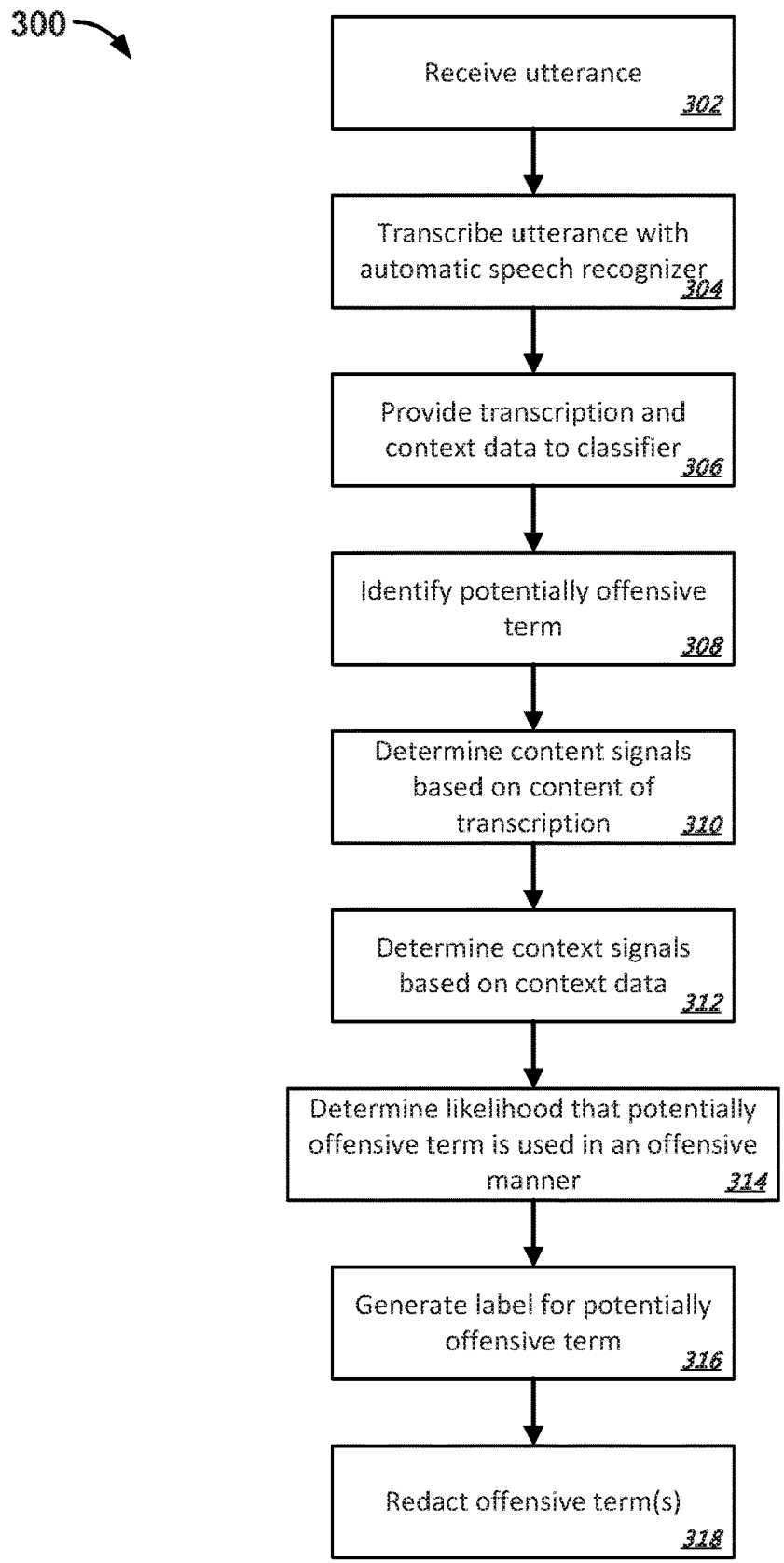
FIG. 3 is a flowchart of an example process for using a classifier to selectively redact offensive words from text samples.

FIG. 3 depicts an example process 300 for determining whether to redact a potentially offensive term from a sample of text. Redaction can include deleting the offensive term from the text sample, substituting the offensive term for another term, obscuring the offensive term (e.g., presenting random characters '^@#^Gr', rather than the original term, 'bloody') or otherwise taking action to change a text sample to block a presentation of the offensive term. The process 300 is described particularly with respect to redaction of terms from the output of a speech recognizer. However, the offensive terms classifiers described throughout this paper can generally be used to redact terms from any sample of text, regardless of its form or origin. For example, a classifier could be used to implement an offensive content filter on a device that is programmed to identify potentially offensive terms in textual content (e.g., web pages, SMS messages, e-mails, etc.), and to redact them if they are determined to actually be used in an offensive manner in the context of its use in the text sample. Generally, a classifier that is trained, for example, as described in FIG. 2, may reduce incidences of over-redaction, in which terms that have both offensive and non-offensive meanings or connotations are redacted regardless of whether the offensive or non-offensive meaning of the term is used in a particular case. This may be beneficial, for example, if a speech recognizer incorrectly transcribes an utterance and mistakenly includes a potentially offensive term. If the context of the entire transcribed utterance does not indicate that the term is used in an offensive manner, then the transcription may pass through the classifier without being labeled as offensive, thereby preventing unnecessary redaction of the term that might cause user frustration. For example, if the utterance "What a muddy day" was recognized as "What a bloody day," the classifier may determine that the term "bloody" in this context is not offensive and may not redact it. On the other hand, the classifier may also detect that a term most likely is offensive in use, even if the term was misinterpreted by a speech recognizer, so that the term may be redacted appropriately.

The process 300 begins at stage 302, where an utterance is received. The utterance can be spoken input from a user of a computing device. For example, a microphone coupled to a computing device may detect that a user has spoken a command to the device or that the user has spoken some text that he or she wishes to be transcribed into a message or document. At stage 304, an automatic speech recognizer can transcribe the utterance. The speech recognizer may be provided locally on the computing device or remotely, such as a cloud-based speech recognition service, for example. The speech recognizer can generally be configured to translate audio data from a speech sample for the user's utterance into a transcribed text sample of the words uttered by the user.

At stage 306, the process 300 provides the transcription of the utterance to the offensive words classifier. In some implementations, the classifier may be trained using the iterative learning techniques described herein, such as by the process 200 of FIG. 2. The classifier can be configured to label a text sample that includes a potentially offensive term with an indication as to whether the term is used in an offensive manner in the text sample. Context data related to the transcription of the utterance can also be provided to the classifier. Context data may include any extrinsic information associated with the utterance beyond the words spoken by the user. Examples of such non-content context information include a location of the user at which the utterance was spoken, user profile information or historical information about a particular user's propensity to use offensive terms, the identity or category of the application into which the utterance was provided, and a transcription confidence score from the speech recognizer that indicates the confidence the recognizer has in the accuracy of the transcription. Later in the process 300, any particular one or combination of pieces of context data may be used by the classifier to label the transcription as being either offensive or non-offensive.

At stage 308, the classifier can identify a potentially offensive term in the transcription. In some implementations, the classifier may be configured to label text samples that include any one or more of multiple different potentially offensive terms. For example, the classifier may be trained on first sets of data for the term "bloody," and second sets of data for the term "shag." Although some of the signals used by the classifier to label a text sample may be the same or similar between different potentially offensive terms, some of the signals may be distinct. Therefore, process 300 can identify the potentially offensive term from the transcription to inform the classifier which signals and parameters to apply in its analysis of the transcription.

At stage 310, the process 300 determines one or more content signals based on the textual content of the transcription. Content signals can be determined from the text of the transcription itself. For example, the process 300 may generate a bag-of-words representation of the transcription, analyze n-grams in the transcription, or otherwise analyze the sentential context of the potentially offensive term as it is used in the transcription. At stage 312, one or more context signals are determined based on the extrinsic context data identified to the classifier at stage 306. For example, the classifier may determine a context signal based on a transcription confidence score provided by the speech recognizer that generated the transcription.

At stage 314, the classifier can determine a likelihood that one or more potentially offensive terms in the transcription are actually being used in an offensive manner in the transcription. In some implementations, the classifier can express such a likelihood as a quantitative score whose magnitude corresponds to a degree of offensiveness of the transcription. The classifier can determine the likelihood based on one or more signals determined from the transcription. These may include the intrinsic content signals that were determined at stage 310 and the extrinsic content signals that were determined at stage 312. For example, the transcription of the utterance, "Tell that bloody maid that I'm ready to shag," can be assigned a high offensiveness score reflecting the strong likelihood that the utterance is offensive. The trigrams "that bloody maid" and "ready to shag" are content signals, for example, that signify increased offensiveness to the classifier. Moreover, the combination of multiple potentially offensive terms ("bloody" and "shag") in the transcription as indicated in a bag-of-words representation of the transcription may also signify a likelihood that the transcription is offensive.

At stage 316, the process 300 can generate a label for the transcription of the utterance. The label can be selected based on the offensiveness score that the classifier determined for the transcription. In some implementations, respective labels can correspond to different ranges of offensiveness scores. For example, assuming that the classifier is configured to generate offensiveness scores in the range 0 through 10, transcriptions that have an offensiveness score in the range 0-5 may be labeled "non-offensive," whereas transcriptions having an offensiveness score in the range 6-10 may be labeled "offensive." Other labeling schemes may also be implemented. For example, a third category of label, "indeterminate," may indicate that a text sample is neither strongly offensive nor clearly non-offensive (e.g. in the offensiveness score range 4/10-6/10). The process 300 can apply a label to a transcription that reflects the most likely category of the transcription as determined by the classifier.

In some implementations, the label assigned to a transcription can be selected based at least in part on the transcription confidence score output by the speech recognizer for the transcription. In some implementations, for instances in which the confidence score is low and there is at least a threshold risk that the transcription does not accurately reflect what the user actually spoke, then the classifier may be biased toward labeling the transcription offensive rather than non-offensive. For example, a classifier may normally be configured to label text samples, including high confidence transcriptions, "non-offensive" for offensiveness scores in the range 0-5, and "offensive" for offensiveness scores in the range 6-10. However, if the transcription confidence score for a transcription is below a threshold score, the classifier may adjust the ranges that apply to each label. For example, the classifier may be configured to label low confidence transcriptions as "non-offensive" for offensiveness scores in the range 0-3, and "offensive" for offensiveness scores in the range 4-10. In some implementations, if the transcription confidence score is below a threshold score, the transcription may automatically be labeled "offensive" regardless of the offensiveness score determined by the classifier. Adjusting the labels in this manner can cause the process 300 to err in the direction of over-redaction of potentially offensive terms if there is a significant likelihood that the transcription is not accurate in order to prevent displaying the potentially offensive term to a user. This may be beneficial, for example, if the audio of the utterance from which the transcription was generated includes a substantial amount of background noise that may cause uncertainty in transcribing the utterance.

At stage 318, one or more offensive terms are redacted from a text sample if the classifier has indicated that the terms are offensive. In some implementations, a term that has been labeled "offensive" can be redacted based on the label, and "non-offensive" labeled terms may not be redacted. In some implementations, offensive terms having an offensiveness score that satisfies a threshold score may be redacted. Redaction includes taking action to block the display of offensive portions of a text sample. Redaction may include one or more of deleting an offensive term, obscuring an offensive term with different characters, or otherwise modifying a text sample so that offensive terms are not displayed in their original form. For example, the word "shag" may be deleted or may be obscured.

Figure 4:
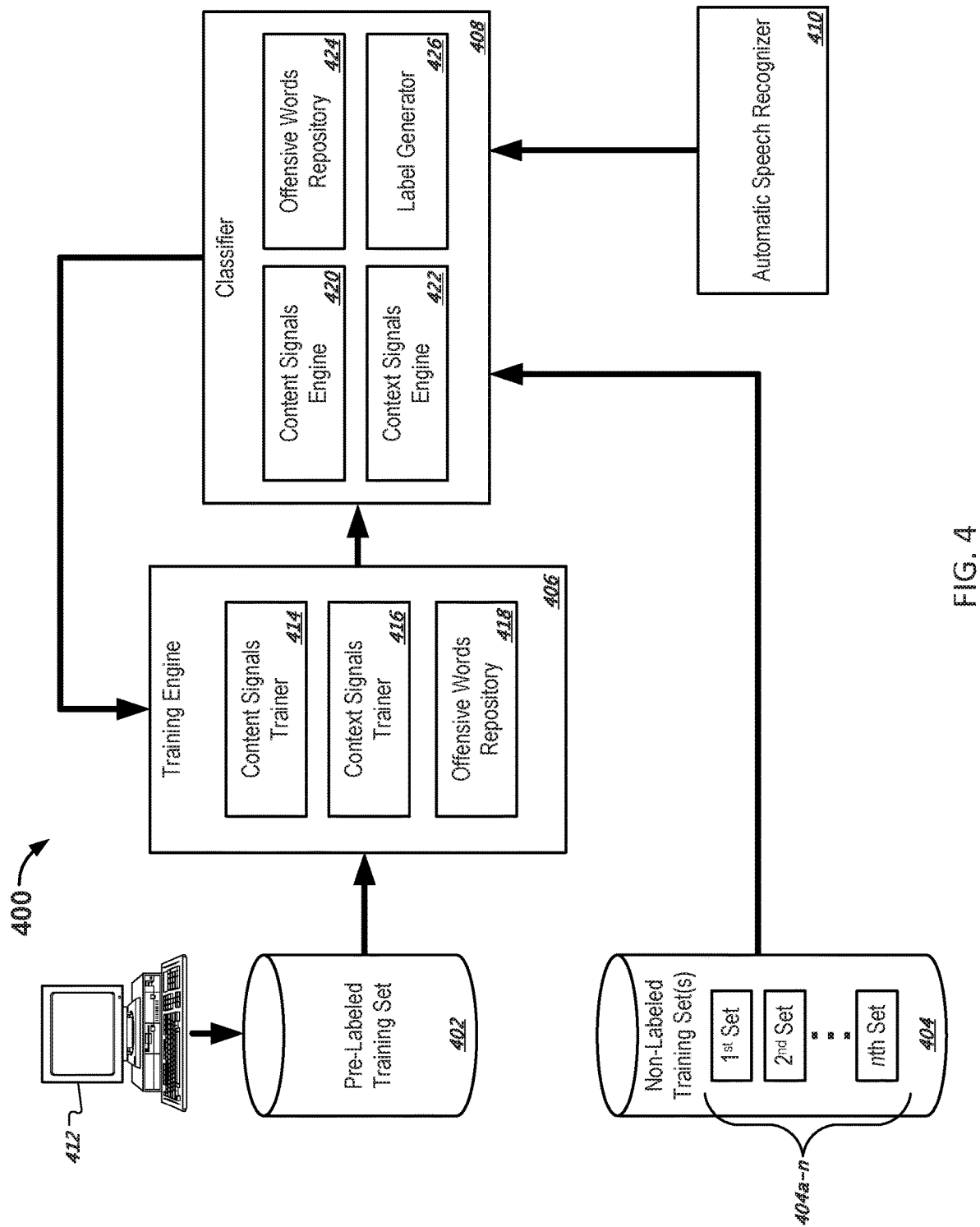
FIG. 4 depicts an example system for iteratively training an offensive words classifier using labeled and unlabeled text samples.

FIG. 4 depicts an example system 400 for iteratively training an offensive words classifier using labeled and unlabeled text samples. In some implementations, the system 400 may be configured to perform related techniques described in this paper, such as the process 400 described with respect to FIG. 4. The system 400 can generally include a pre-labeled first set of training text samples 402, one or more non-labeled additional sets of training text samples 404a-n, a training engine 406, an offensive words classifier 408, automatic speech recognizer 410, and user console 412.

The pre-labeled first set of training text samples 402 can include one or more samples of text that include a potentially offensive term. The text samples in the pre-labeled set 402 may be manually labeled by one or more users in some implementations, such as through individual evaluation of the text samples on user console 412. For example, each text sample in the pre-labeled set 402 may be labeled either "offensive" or "non-offensive." In some implementations, additional or different label categories may be used. In some implementations, only offensive text samples may be labeled, while it may be inferred that non-labeled text samples are non-offensive.

The one or more non-labeled additional training sets of text samples 404a-n can include text samples having the same potentially offensive term or terms as the pre-labeled training set 402. However, the samples in training sets 404a-n are initially unlabeled—i.e., no determination has been made as to whether these samples are offensive or not.

The training engine 406 is configured to analyze text samples in a training set to determine one or more signals for the classifier 408 that indicate whether a potentially offensive term in a text sample is likely being used in an offensive manner in the text sample. The training engine 406 can include a content signals trainer 414, a context signals trainer 416, and an offensive words repository 418. The offensive words repository 418 can include a list of potentially offensive words or other terms so that the training engine 406 can detect which word in a text sample is likely the potentially offensive term. In some implementations, different signals can be trained for different potentially offensive terms. For example, the training engine 406 may determine different classifier signals that apply for different potentially offensive terms. The content signals trainer 414 is configured to analyze the textual content of text samples in a training set 402, 404a-n to determine content-based signals. The context signals trainer 416 can statistically analyze extrinsic context information outside of the content of text samples to determine non-content context signals for the classifier 408.

The classifier 408 is configured to generate an indication of the offensiveness of a text sample. In some implementations, the indication of offensiveness can be an offensiveness score that corresponds to a determined degree of offensiveness of a potentially offensive term in a text sample. For example, a racial or religious slur may be very offensive and have a high offensiveness score, whereas a mild profanity with less specific meaning may have a lower offensiveness score. The offensiveness score may also be biased based on the confidence of the classifier's 408 analysis of a text sample. For example, if a particular text sample does not correlate strongly with any signal on which the classifier 408 is trained such that the classifier 408 is unable to confidently determine the offensiveness for a text sample, then the offensiveness score may be adjusted. In some implementations, the offensiveness score can be adjusted higher to indicate a greater degree of offensiveness if the confidence of the classifier 408 decreases. In some implementations, the offensiveness score and a classifier confidence score may be determined and output separately by the classifier 408. In some implementations, the indication of offensiveness output by the classifier 408 can be a label that indicates a category of the text sample or a term within the text sample such as an offensive category or a non-offensive category.

The classifier 408 can include one or more of a content signals engine 420, context signals engine 422, offensive words repository 424, and label generator 426. The content signals engine 420 can be configured to identify one or more features of a text sample that, based on an analysis of at least one training set of samples 402, 404a-n, tend to increase or decrease a likelihood that a potentially offensive term in the text sample is offensive. The context signals engine 422 can be configured to identify one or more pieces of extrinsic information related to a text sample that, based on an analysis of at least one training set of samples 402, 404a-n, tend to increase or decrease a likelihood that a potentially offensive term in the text sample is offensive. The list of potentially offensive words or other terms on which the classifier 408 is trained can be stored in the offensive words repository 424. Using the features of the text sample identified by content signals engine 420 and context signals engine 422, the label generator 426 is configured to generate an offensiveness score and/or offensiveness label for a text sample. In some implementations, the classifier 408 can generate an offensiveness score and/or offensiveness label for a transcription of a speech sample that was generated by the automatic speech recognizer 410.

The system 400 can be configured to iteratively train and re-train the classifier 408. In a first training cycle, the training engine 406 can train the classifier 408 using the pre-labeled first set of training samples 402. Once the classifier 408 is initially trained, then a first unlabeled set of text samples 404a can be provided to the initially trained classifier 408 to be labeled or scored to reflect the offensiveness of at least one term in the respective text samples. Once this set of text samples 404a is labeled by the classifier 408, the set 404a is submitted to the training engine 406, which can then generate a re-trained second generation classifier 408. The system 400 can repeat this iterative training process one or more additional cycles until a stopping point is reached, which can be based on achieving at least a pre-defined accuracy of the classifier 408 in some implementations.

Figure 5:
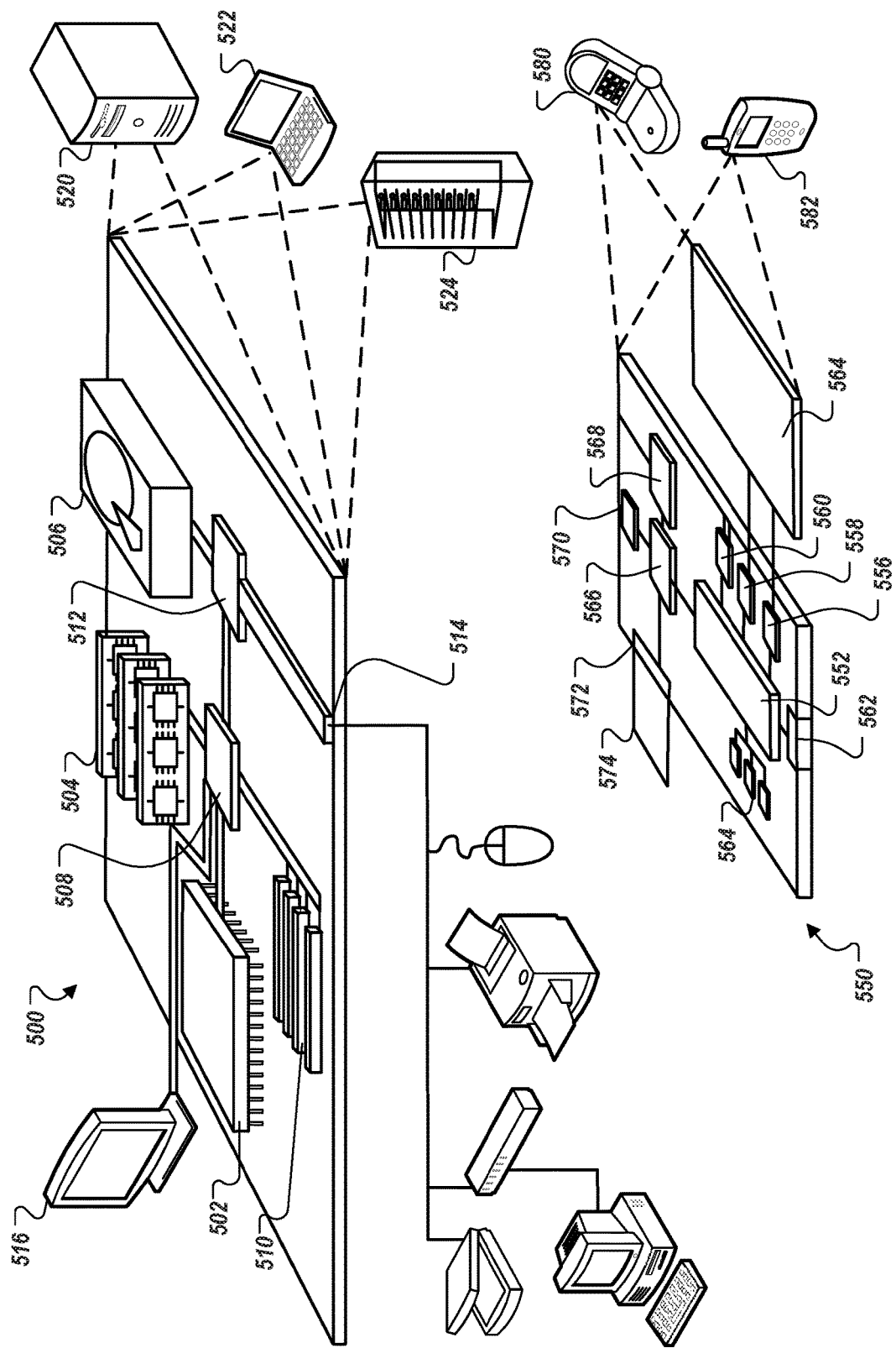
FIG. 5 depicts an example of a computing device and a mobile computing device that can be used to implement the techniques described herein.

FIG. 5 shows an example of a computing device 500 and a mobile computing device that can be used to implement the techniques described herein. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving a text sample at a computing device, the text sample comprising a set of terms;

identifying, by the computing device, that a first term of the set of terms of the text sample is designated as a term that is potentially offensive in some but not all contexts;

after identifying that the first term of the set of terms of the text sample is designated as a term that is potentially offensive in some but not all contexts, providing the text sample to an offensive term classifier, wherein the offensive term classifier is trained to process text samples containing the first term and to generate indications of whether, in respective contexts defined by the text samples, the first term is to be selectively redacted from a representation of the text sample that is output;

obtaining, by the computing device and from the offensive term classifier, an indication that, in a particular context defined by the text sample, the first term is used in an offensive manner;

in response to obtaining the indication that, in the particular context defined by the text sample, the first term is used in the offensive manner, redacting the first term from the text sample to generate a redacted version of the text sample;

presenting, by the computing device, the redacted version of the text sample;

after presenting the redacted version of the text sample, receiving a user input to un-redact the first term; and retraining the offensive term classifier using the user input as a training signal that indicates that the first term is to not be selectively redacted from representations of text samples.

2. The computer-implemented method of claim 1, further comprising:

receiving, by the computing device, an utterance spoken by a user of the computing device; and transcribing the utterance to generate the text sample.

3. The computer-implemented method of claim 1, wherein:

the text sample is a transcription of an utterance spoken by a user of the computing device; and the method further comprises providing information about the user of the computing device as an input to the offensive term classifier along with the text sample to be used by the offensive term classifier in generating an indication of whether the first term is to be selectively redacted.

4. The computer-implemented method of claim 1, wherein:

the text sample was obtained through a website accessed by the computing device or an application on the computing device;

the method further comprises providing information identifying the website or the application as an input to the offensive term classifier along with the text sample to be used by the offensive term classifier in generating an indication of whether the first term is to be selectively redacted.

5. The computer-implemented method of claim 1, wherein the offensive term classifier was trained using machine-learning techniques.

6. The computer-implemented method of claim 1, wherein:

the text sample is a transcription of an utterance spoken by a user of the computing device;

the method further comprises obtaining a score that indicates a speech recognition confidence score for the utterance and providing the speech recognition confidence score as an input to the offensive term classifier along with the text sample to be used by the offensive term classifier in generating an indication of whether the first term is to be selectively redacted.

7. The computer-implemented method of claim 6, wherein the offensive term classifier is more likely to indicate that the first term is to be selectively redacted when the speech recognizer confidence score that is input to the offensive term classifier indicates a lower confidence in the accuracy of the transcription, and the offensive term classifier is less likely to indicate that the first term is to be selectively redacted when the score indicates a higher confidence in the accuracy of the transcription.

8. The computer-implemented method of claim 1, wherein the offensive term classifier is trained to use information about additional words in the text sample other than the first term to determine whether the first term is to be selectively redacted.

9. The computer-implemented method of claim 1, wherein the offensive term classifier is specific to the first term, such that the offensive term classifier is only trained to process text samples containing the first term and to generate indications of whether the first term is to be selectively redacted.

10. The computer-implemented method of claim 1, further comprising:

receiving a second text sample at the computing device;

identifying, by the computing device, that the second text sample contains the first term that is designated as a term that is also potentially offensive in some but not all contexts;

providing the second text sample to the offensive term classifier;

obtaining, by the computing device and from the offensive term classifier, an indication that the first term is not to be selectively redacted;

in response to obtaining the indication that the first term is not to be selectively redacted, presenting an un-redacted version of the second text sample.

11. One or more non-transitory computer-readable media having instructions stored thereon that, when executed by one or more processors of a computing device, cause the one or more processors to perform operations comprising:

receiving a text sample at a computing device, the text sample comprising a set of terms;

identifying, by the computing device, that a first term of the set of terms of the text sample is designated as a term that is potentially offensive in some but not all contexts;

after identifying that the first term of the set of terms of the text sample is designated as a term that is potentially offensive in some but not all contexts, providing the text sample to an offensive term classifier, wherein the offensive term classifier is trained to process text samples containing the first term and to generate indications of whether, in respective contexts defined by the text samples, the first term is to be selectively redacted from a representation of the text sample that is output;

obtaining, by the computing device and from the offensive term classifier, an indication that, in a particular context defined by the text sample, the first term is used in an offensive manner;

in response to obtaining the indication that, in the particular context defined by the text sample, the first term is used in the offensive manner, redacting the first term from the text sample to generate a redacted version of the text sample;

presenting, by the computing device, the redacted version of the text sample;

after presenting the redacted version of the text sample, receiving a user input to un-redact the first term; and retraining the offensive term classifier using the user input as a training signal that indicates that the first term is to not be selectively redacted from representations of text samples.

12. The computer-readable media of claim 11, wherein the operations further comprise:

receiving, by the computing device, an utterance spoken by a user of the computing device; and transcribing the utterance to generate the text sample.

13. The computer-readable media of claim 11, wherein:

the text sample is a transcription of an utterance spoken by a user of the computing device; and the operations further comprise providing information about the user of the computing device as an input to the offensive term classifier along with the text sample to be used by the offensive term classifier in generating an indication of whether the first term is to be selectively redacted.

14. The computer-readable media of claim 11, wherein:

the text sample was obtained through a website accessed by the computing device or an application on the computing device;

the operations further comprise providing information identifying the website or the application as an input to the offensive term classifier along with the text sample to be used by the offensive term classifier in generating an indication of whether the first term is to be selectively redacted.

15. The computer-readable media of claim 11, wherein the offensive term classifier was trained using machine-learning techniques.

16. The computer-readable media of claim 11, wherein:

the text sample is a transcription of an utterance spoken by a user of the computing device;

the operations further comprise obtaining a score that indicates a speech recognition confidence score for the utterance and providing the speech recognition confidence score as an input to the offensive term classifier along with the text sample to be used by the offensive term classifier in generating an indication of whether the first term is to be selectively redacted.

17. The computer-readable media of claim 16, wherein the offensive term classifier is more likely to indicate that the first term is to be selectively redacted when the speech recognizer confidence score that is input to the offensive term classifier indicates a lower confidence in the accuracy of the transcription, and the offensive term classifier is less likely to indicate that the first term is to be selectively redacted when the score indicates a higher confidence in the accuracy of the transcription.

18. A computing device comprising:

one or more processors; and one or more computer-readable media having instructions stored thereon that, when executed by the one or more processors, cause the one or more processors to perform operations comprising:

receiving a text sample at a computing device, the text sample comprising a set of terms;

identifying, by the computing device, that a first term of the set of terms of the text sample is designated as a term that is potentially offensive in some but not all contexts;

after identifying that the first term of the set of terms of the text sample is designated as a term that is potentially offensive in some but not all contexts, providing the text sample to an offensive term classifier, wherein the offensive term classifier is trained to process text samples containing the first term and to generate indications of whether, in respective contexts defined by the text samples, the first term is to be selectively redacted from a representation of the text sample that is output;

obtaining, by the computing device and from the offensive term classifier, an indication that, in a particular context defined by the text sample, the first term is used in an offensive manner;

in response to obtaining the indication that, in the particular context defined by the text sample, the first term is used in the offensive manner, redacting the first term from the text sample to generate a redacted version of the text sample;

presenting, by the computing device, the redacted version of the text sample;

after presenting the redacted version of the text sample, receiving a user input to un-redact the first term; and retraining the offensive term classifier using the user input as a training signal that indicates that the first term is to not be selectively redacted from representations of text samples.

* * * * *